US012176169B2

(12) United States Patent
Kinsel et al.

(10) Patent No.: US 12,176,169 B2
(45) Date of Patent: Dec. 24, 2024

(54) CIRCUIT INTERRUPTING DEVICE FOR PROVIDING A FAIL-SAFE LOCK OUT TRIP MECHANISM OR A TEMPERATURE ACTIVATED, PERMANENT LOCK OUT TRIP MECHANISM IN RESPONSE TO A SELF-TEST

(71) Applicant: Siemens Industry, Inc., Alpharetta, GA (US)

(72) Inventors: Hugh T. Kinsel, Sugar Hill, GA (US); Joselito Endozo, Dacula, GA (US); Russell Thomas Watford, Lawrenceville, GA (US); Raiden Jay Kim, Buford, GA (US); Brian Timothy McCoy, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 401 days.

(21) Appl. No.: 17/657,979

(22) Filed: Apr. 5, 2022

(65) Prior Publication Data

US 2023/0317394 A1 Oct. 5, 2023

(51) Int. Cl.
*H01H 37/76* (2006.01)
*H01H 85/055* (2006.01)
*H01H 85/36* (2006.01)

(52) U.S. Cl.
CPC .......... *H01H 85/36* (2013.01); *H01H 85/055* (2013.01); *H01H 2037/762* (2013.01); *H01H 2235/01* (2013.01)

(58) Field of Classification Search
CPC .. H01H 85/36; H01H 85/055; H01H 2235/01; H01H 37/761; H01H 37/764–766; H01H 2037/762; H01H 2037/769; H01H 2037/763; H01H 85/143
See application file for complete search history.

(56) References Cited

U.S. PATENT DOCUMENTS

| | | | | |
|---|---|---|---|---|
| 2002/0006022 A1* | 1/2002 | DiSalvo | H01H 71/62 361/42 |
| 2017/0148602 A1* | 5/2017 | Wang | H01H 37/761 |
| 2019/0080826 A1* | 3/2019 | Kamensek | H01H 37/32 |
| 2021/0104372 A1* | 4/2021 | Qiu | H01H 85/306 |

* cited by examiner

*Primary Examiner* — Jacob R Crum

(57) ABSTRACT

A circuit interrupting device comprises a conductor capable of generating heat and a temperature-activated, permanent lock out trip mechanism. The mechanism includes a plunger, a compressed or stretched spring and a fusible metal to hold the plunger. The mechanism is located near the conductor that generates heat and is configured such that when the fusible metal melts when at least one heating element is energized or a holding wire fuses when energized in response to a failed self-test the plunger is released: allowing the compressed or stretched spring to convert its potential energy into kinetic energy and moving the plunger to generate a force to unlatch a latch releasing a first spring to open a contactor switch removing power from an electrical circuit. The constant force generated by the compressed or stretched spring on the plunger inhibits the circuit interrupting device from resetting.

20 Claims, 13 Drawing Sheets

FIG. 14

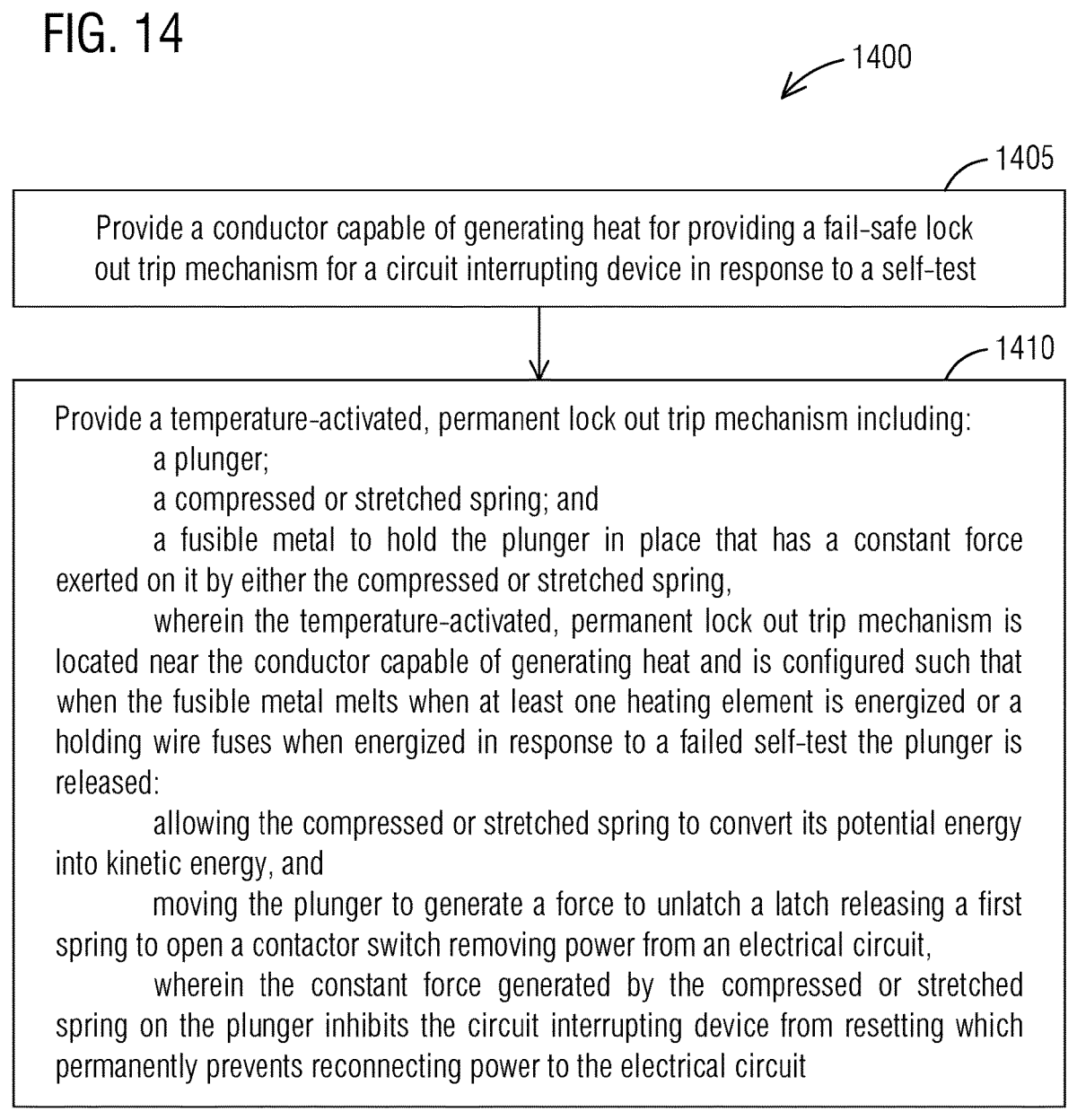

1400

1405

Provide a conductor capable of generating heat for providing a fail-safe lock out trip mechanism for a circuit interrupting device in response to a self-test

1410

Provide a temperature-activated, permanent lock out trip mechanism including:

a plunger;

a compressed or stretched spring; and a fusible metal to hold the plunger in place that has a constant force exerted on it by either the compressed or stretched spring, wherein the temperature-activated, permanent lock out trip mechanism is located near the conductor capable of generating heat and is configured such that when the fusible metal melts when at least one heating element is energized or a holding wire fuses when energized in response to a failed self-test the plunger is released:

allowing the compressed or stretched spring to convert its potential energy into kinetic energy, and moving the plunger to generate a force to unlatch a latch releasing a first spring to open a contactor switch removing power from an electrical circuit, wherein the constant force generated by the compressed or stretched spring on the plunger inhibits the circuit interrupting device from resetting which permanently prevents reconnecting power to the electrical circuit

CIRCUIT INTERRUPTING DEVICE FOR PROVIDING A FAIL-SAFE LOCK OUT TRIP MECHANISM OR A TEMPERATURE ACTIVATED, PERMANENT LOCK OUT TRIP MECHANISM IN RESPONSE TO A SELF-TEST

BACKGROUND

1. Field

Aspects of the present invention generally relate to a circuit interrupting device that provides a fail-safe lock out trip mechanism or a temperature activated, permanent lock out trip mechanism in response to a self-test.

2. Description of the Related Art

Electrical power is distributed to loads throughout buildings using insulated conductors of different sizes appropriate for the amplitude of current being delivered to the load. The amount of current for continuous safe operation for a particular wire gage size is known as rated current. If the rated current is exceeded, then the conductor will overheat to a point that the insulation melts resulting in hazardous conditions of electrical shock due to exposed voltage potential energy and of flame ignition due to exposed heat energy.

Initially fuses were implemented to prevent these hazardous conditions resulting from overloading the electrical circuit. Fuses were eventually replaced by circuit breakers which function as resettable switches. The circuit breaker typically has a robust main contactor that is spring loaded, but held in a closed switch position using a latch.

For hazardous overload current situations greater than approximately 800% to 1000% of rated current on the electrical circuit, the hazardous overload current itself is used to generate a magnetic force to unlatch the latch releasing a spring to open the contactor switch removing power from the electrical circuit. For hazardous overload current situations greater than 135% but less than approximately 800% to 1000%, a bimetallic device in series with the electrical current is situated near the latch such that heat generated by the overload current causes the bimetallic device to warp generating a force to unlatch the latch releasing a spring to open the contactor switch removing power from the electrical circuit.

Presently, and in the very near future, alternative methods of detecting hazardous overload current are being developed that utilize a solenoid or an electromagnet to generate a magnetic force to unlatch the latch releasing a spring to open the contactor switch removing power from the electrical circuit. In many applications the solenoid or electromagnet is energized by a solid-state switch. Typically, the current utilized to energize the solenoid or electromagnet exceeds the rating of the wire used on the winding of the solenoid or electromagnet and of the rating of the solid-state switch and could potentially damage the solenoid or electromagnet and the solid-state switch if the response of the unlatching mechanism is sluggish and fails to remove power within a few cycles of being energized, or worse, fails to remove power at all. Thus, there is a need for a mechanism to permanently remove power from the electrical circuit should the solenoid or electromagnet or the solid-state switch became damaged and/or inoperable.

Additionally, electronic circuits are used to detect faults in the electrical circuit such as overload current faults, ground faults, and arc faults. The electronic components that make up these electronic detection circuits undergo stress from normal operation and environmental stress eventually resulting in component and circuit failure. Self-test or auto-monitoring methods/circuits check or monitor the trip circuit, the power supply, the sensors, and the electronic detection circuits for proper function.

Presently, the response to a malfunction has been to energize the trip circuit opening the main contact switch removing power from the electrical circuit. However, there are two problems. First, the circuit breaker can be powered back on again and may take a few seconds for a response from the self-test or auto-monitoring process or circuit to trip the breaker potentially allowing brief exposure to a hazardous condition. Second, if the malfunction is in the trip circuit, then the main contact remains closed thus potentially allowing exposure to a hazardous condition indefinitely.

Therefore, there is a need for a better circuit interrupting device.

SUMMARY

Briefly described, aspects of the present invention relate to a circuit interrupting device that provides a fail-safe lock out trip mechanism in response to a self-test. The invention solves the problem by utilizing fusible metal such as solder, or a low-melting point metal alloy, to hold a plunger in place that has a constant force exerted on it by either a compressed or stretched spring. The device is ideally located near a conductor that generates heat and configured such that when the fusible metal melts the plunger is released allowing a spring to convert its potential energy into kinetic energy, moving the plunger to generate a force to unlatch the latch releasing a spring to open the contactor switch removing power from the electrical circuit. Thereafter, the constant force generated by the spring on the plunger inhibits the circuit breaker from resetting which permanently prevents reconnecting power to the electrical circuit.

In one embodiment, the invention has fusible metal that is energized to generate heat in response to a malfunction in the trip circuit, the power supply, the sensors, or the electronic detection circuits, which melts the fusible metal releasing the plunger allowing a spring to convert potential energy into kinetic energy, moving the plunger to generate a force to unlatch the latch releasing a spring to open the contactor switch removing power from the electrical circuit. Thereafter, the constant force generated by the spring on the plunger inhibits the circuit breaker from resetting which permanently prevents reconnecting power to the electrical circuit.

In another embodiment, the invention has heating elements surrounding the fusible metal that is energized in response to a malfunction in the trip circuit, the power supply, the sensors, or the electronic detection circuits, which melts the fusible metal releasing the plunger allowing a spring to convert potential energy into kinetic energy, moving the plunger to generate a force to unlatch the latch releasing a spring to open the contactor switch removing power from the electrical circuit. Thereafter, the constant force generated by the spring on the plunger inhibits the circuit breaker from resetting which permanently prevents reconnecting power to the electrical circuit.

In accordance with one illustrative embodiment of the present invention, a circuit interrupting device comprises a conductor capable of generating heat and a temperature-activated, permanent lock out trip mechanism including: a plunger, a compressed or stretched spring and a fusible metal to hold the plunger in place that has a constant force exerted on it by either the compressed or stretched spring. The temperature-activated, permanent lock out trip mechanism is located near the conductor that generates heat and is configured such that when the fusible metal melts when at least one heating element is energized or a holding wire fuses when energized in response to a failed self-test the plunger is released: allowing the compressed or stretched spring to convert its potential energy into kinetic energy, and moving the plunger to generate a force to unlatch a latch releasing a first spring to open a contactor switch removing power from an electrical circuit. The constant force generated by the compressed or stretched spring on the plunger inhibits the circuit interrupting device from resetting which permanently prevents reconnecting power to the electrical circuit.

In accordance with one illustrative embodiment of the present invention, a method of providing a fail-safe lock out trip mechanism for a circuit interrupting device in response to a self-test. The method comprises providing a conductor capable of generating heat and providing a temperature-activated, permanent lock out trip mechanism including: a plunger, a compressed or stretched spring and a fusible metal to hold the plunger in place that has a constant force exerted on it by either the compressed or stretched spring. The temperature-activated, permanent lock out trip mechanism is located near the conductor that generates heat and is configured such that when the fusible metal melts when at least one heating element is energized or a holding wire fuses when energized in response to a failed self-test the plunger is released: allowing the compressed or stretched spring to convert its potential energy into kinetic energy, and moving the plunger to generate a force to unlatch a latch releasing a first spring to open a contactor switch removing power from an electrical circuit. The constant force generated by the compressed or stretched spring on the plunger inhibits the circuit interrupting device from resetting which permanently prevents reconnecting power to the electrical circuit.

In accordance with one illustrative embodiment of the present invention, a circuit interrupting device comprises a conductor and a temperature-activated, permanent lock out trip mechanism including: a plunger, a compressed or stretched spring and a fusible metal to hold the plunger in place that has a constant force exerted on it by either the compressed or stretched spring. The temperature-activated, permanent lock out trip mechanism is configured such that when the fusible metal melts the plunger is released: allowing the compressed or stretched spring to convert its potential energy into kinetic energy, and moving the plunger to generate a force to unlatch a latch releasing a first spring to open a contactor switch removing power from an electrical circuit. The constant force generated by the compressed or stretched spring on the plunger inhibits the circuit interrupting device from resetting which permanently prevents reconnecting power to the electrical circuit.

BRIEF DESCRIPTION OF THE DRAWINGS

FIG. 14 illustrates a schematic view of a flow chart of a method of providing a fail-safe lock out trip mechanism for a circuit interrupting device in response to a self-test in accordance with an exemplary embodiment of the present invention.

DETAILED DESCRIPTION

Figure 1:
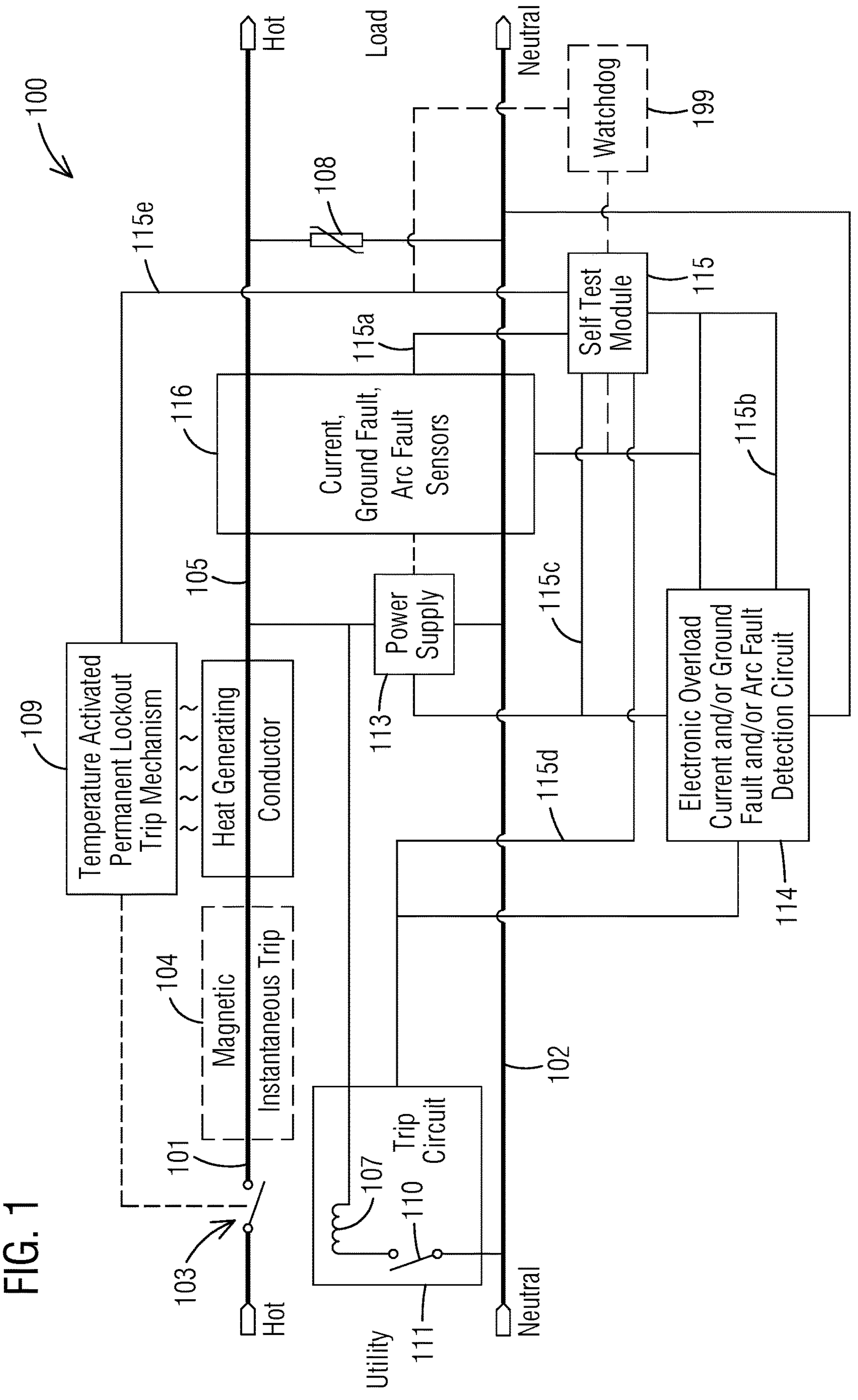
FIG. 1 illustrates a circuit interrupting device that provides a fail-safe lock out trip mechanism in response to a self-test in accordance with an exemplary embodiment of the present invention.

To facilitate an understanding of embodiments, principles, and features of the present invention, they are explained hereinafter with reference to implementation in illustrative embodiments. In particular, they are described in the context of a circuit interrupting device that provides a fail-safe lock out trip mechanism in response to a self-test. Embodiments of the present invention, however, are not limited to use in the described devices or methods. This invention provides a method and an apparatus to generate a force to unlatch the latch releasing a spring to open a contactor switch removing power from an electrical circuit within calibration trip time limits specified in UL489 should a trip circuit solenoid or electromagnet or a solid-state switch became damaged and/or inoperable, or should a current sensor or an electronic overload current detection circuit/apparatus become damaged or inoperable. In addition, this invention provides a method and an apparatus to generate a force to unlatch the latch releasing a spring to open the contactor switch removing power from the electrical circuit in response to a malfunction detected in a trip circuit, or a power supply, or sensors, or any of electronic detection circuits. The invention also permanently prevents a circuit interrupting device from being reset and turned back on and re-applying power to the electrical circuit. Ultimately, this invention provides a fail-safe backup mechanism to permanently remove power from the electrical circuit within the calibration trip time limits specified in UL489 should the trip circuit, current sensor, or the electronic overload current detection circuit/apparatus become damaged or inoperable, and or a fail-safe mechanism to permanently remove power from the electrical circuit in response to a malfunction in the trip circuit, the power supply, the sensors, or any of the electronic detection circuits.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the circuit interrupting device according to the present disclosure are described below with reference to FIGS. 1-14 herein. Like reference numerals used in the drawings identify similar or identical elements throughout the several views. The drawings are not necessarily drawn to scale.

Consistent with one embodiment of the present invention, FIG. 1 represents a circuit interrupting device 100 in accordance with an exemplary embodiment of the present invention. FIG. 1 illustrates the circuit interrupting device 100 that provides a fail-safe lock out trip mechanism or a temperature activated, permanent lock out trip mechanism 109 in response to a self-test in accordance with an exemplary embodiment of the present invention.

The circuit interrupting device 100 comprises a hot conductor 101, a main contactor switch 103 that is spring loaded but held in a closed switch position using a latch, an optional electromagnetic device 104 configured to instantaneously generate a magnetic force capable of unlatching the latch releasing a spring to open the contactor switch 103 removing power from an electrical circuit when a hazardous overload current exceeds 800% of rated load current. The circuit interrupting device 100 comprises a section of conductor 105 that generates heat, a trip circuit 111 in the form of a solenoid or electromagnet 107 such that when a switch 110 is closed the solenoid is disposed across a hot conductor 101 and a connection to a neutral conductor 102. A metal oxide varistor (MOV) 108 is also disposed across a hot conductor and a neutral conductor where it protects electronics from surges.

The circuit interrupting device 100 comprises an electronic overload current detection and/or ground fault detection and/or arc fault detection circuit 114 with a corresponding sensor and or sensors 116, a self-test or auto-monitoring module 115, a power supply 113, and the temperature activated, permanent lock out trip mechanism 109 located in close proximity to the section of conductor 105 that generates heat. The power supply 113 supplies appropriate voltage and current to the electronic detection circuit 114 and the self-test module 115 and or the sensor or sensors 116 from the hot conductor 101. The sensors 116 are configured to sense vibration and or heat, or sense voltage and or current on the hot conductor 101 and/or the neutral conductor 102 whose output is coupled to the electronic detection circuit 114. The electronic detection circuit 114 is configured to receive the sensors 116 output, processes the data to determine if there exists an overload current fault and or a ground fault and or a grounded neutral fault and or an arc fault. Upon determination of a hazardous condition, a trip signal is output to the trip circuit 111 which closes the switch 110 that energizes the solenoid 107 producing a magnetic force capable of moving an armature that unlatches the latch releasing a spring to open the contactor switch 103 removing power from the electrical circuit. The temperature activated, permanent lock out trip mechanism 109 upon reaching a predefined temperature also generates a force capable of moving an armature that unlatches the latch releasing a spring to open the contactor switch 103 removing power from the electrical circuit. Once activated, the temperature activated, permanent lock out trip mechanism 109 inhibits the latch from latching which prevents a reset of the circuit interrupting device 100. Thus, the circuit interrupting device 100 is permanently disabled and power can no longer be reconnected to the electrical circuit. The self-test module 115 typically generates output stimuli on node **115*a* coupled to the sensor(s) 116 and monitors an electronic detection circuit output on node 115*b* for a malfunction, or monitors for a trip signal on a node 115*d* while disabling the trip circuit 111**.

Alternatively, the self-test module 115 may monitor the health of the sensor(s) 116 directly or by some other indirect means. In addition, the self-test module 115 may monitor the trip circuit 111 on node **115*d* for a malfunction in response to a stimulus provided by the self-test module directly or indirectly through the electronic detection circuit 114 while ensuring the trip circuit 111 does not completely energize and trip the circuit interrupting device 100**.

Alternatively, the self-test module 115 may monitor the electronic detection circuit 114 directly or by some other indirect means. And the self-test module 115 typically monitors the power supply 113 output voltage and or current on node **115*c*** for a malfunction.

Regardless of the exact configuration, the self-test module 115 is configured to continuously and or periodically check the functionality of the trip circuit 111, the power supply 113, the sensors 116, and the electronic detection circuits 114, and generates an output signal on node **115*e* coupled to the temperature activated, permanent lock out trip mechanism 109 in response to a malfunction of the trip circuit 111, the power supply 113, the sensors 116, or the electronic detection circuits 114. An optional watchdog circuit 199 may be configured to monitor the self-test module 115 and generate an output signal on node 115*e* coupled to the temperature activated, permanent lock out trip mechanism should the self-test module 115 stop functioning or malfunction. This output signal on node 115*e* from the self-test module 115 is configured to energize a heating device contained in the temperature activated, permanent lock out trip mechanism 109. As described above, the temperature activated, permanent lock out trip mechanism 109 upon reaching a predefined temperature generates a force capable of moving an armature that unlatches the latch releasing a spring to open the contactor switch 103 removing power from the electrical circuit. Once activated, the temperature activated, permanent lock out trip mechanism 109 inhibits the latch from latching which prevents a reset of the circuit interrupting device 100. Thus, the circuit interrupting device 100** is permanently disabled and power can no longer be reconnected to the electrical circuit.

Figure 2:
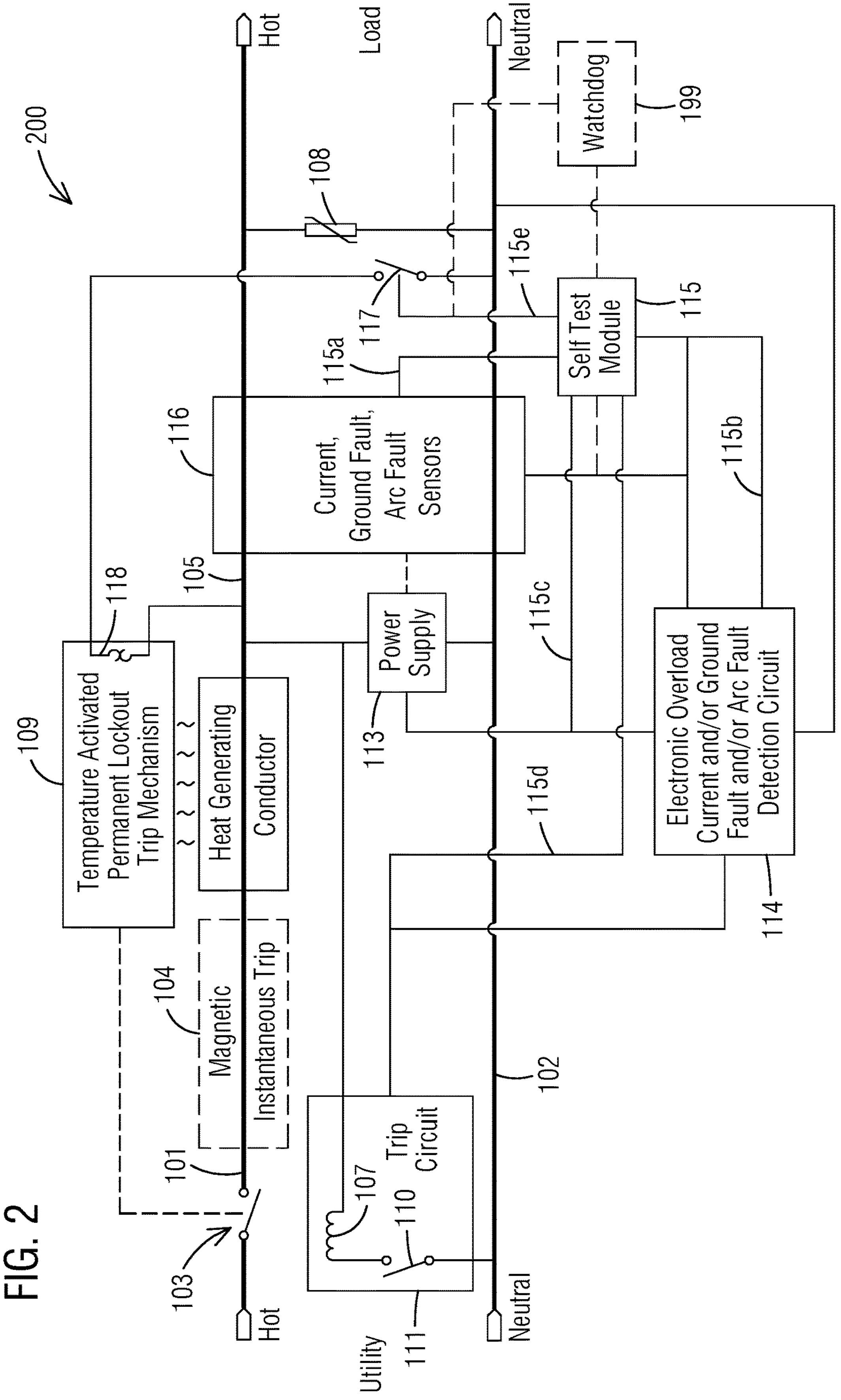
FIG. 2 illustrates a circuit interrupting device in accordance with an alternate embodiment of the present invention.

Referring to FIG. 2, it illustrates a circuit interrupting device 200 in accordance with an alternate embodiment of the present invention. The alternate embodiment shown in FIG. 2 describes the circuit interrupting device 200 that comprises the hot conductor 101, the main contactor switch 103 that is spring loaded but held in a closed switch position using a latch, and the optional electromagnetic device 104 configured to instantaneously generate a magnetic force capable of unlatching the latch releasing a spring to open the main contactor switch 103 removing power from an electrical circuit when a hazardous overload current exceeds 800% of rated load current.

The circuit interrupting device 200 further comprises the section of conductor 105 that generates heat, the trip circuit 111 in the form of the solenoid or electromagnet 107 such that when the switch 110 is closed the solenoid 107 is disposed across the hot conductor 101 and a connection to the neutral conductor 102. The circuit interrupting device 200 further comprises the electronic overload current detection and or ground fault detection and or arc fault detection circuit 114 with the corresponding sensor and or sensors 116, the self-test or auto-monitoring module 115 and the optional watchdog 199, the power supply 113, and the temperature activated, permanent lock out trip mechanism 109 located in close proximity to the section of conductor 105 that generates heat, and a switch 117 that when closed disposes a heating element 118 contained within the temperature activated permanent lock out trip mechanism 109 across the hot conductor 101 and the neutral conductor 102. The power supply 113 supplies appropriate voltage and current to the electronic detection circuit 114 and the self-test module 115 and or the sensor or sensors 116 from the hot conductor 101. The sensors 116 are configured to sense vibration and or heat, or sense voltage and or current on the hot conductor 101 and or the neutral conductor 102 whose output is coupled to the electronic detection circuit 114. The electronic detection circuit 114 is configured to receive the sensors 116 output, processes the data to determine if there exists an overload current fault and/or a ground fault and/or a grounded neutral fault and/or an arc fault.

Upon determination of a hazardous condition, a trip signal is output to the trip circuit 111 which closes the switch 110 that energizes the solenoid 107 producing a magnetic force capable of moving an armature that unlatches the latch releasing a spring to open the main contactor switch 103, removing power from the electrical circuit. The temperature activated, permanent lock out trip mechanism 109 upon reaching a predefined temperature also generates a force capable of moving an armature that unlatches the latch releasing a spring to open the main contactor switch 103 removing power from the electrical circuit. Once activated, the temperature activated, permanent lock out trip mechanism 109 inhibits the latch from latching which prevents a reset of the circuit interrupting device 200. Thus, the circuit interrupting device 200 is permanently disabled and power can no longer be reconnected to the electrical circuit. The self-test module 115 typically generates output stimuli on node 115*a* coupled to the sensor(s) 116 and monitors an electronic detection circuit output on node 115*b* for a malfunction, or monitors for a trip signal on 115*d* while disabling the trip circuit 111.

Alternatively, the self-test module 115 may monitor the health of the sensor(s) 116 directly or by some other indirect means. In addition, the self-test module 115 may monitor the trip circuit on node 115*d* for a malfunction in response to a stimulus provided by the self-test module 115 directly or indirectly through the electronic detection circuit 114 while ensuring the trip circuit 111 does not completely energize and trip the circuit interrupting device 200.

Alternatively, the self-test module 115 may monitor the electronic detection circuit 114 directly or by some other indirect means. And the self-test module 115 typically monitors the power supply 113 output voltage and or current on node 115*c* for a malfunction.

Regardless of the exact configuration, the self-test module 115 is configured to continuously and or periodically check the functionality of the trip circuit 111, the power supply 113, the sensors 116, and the electronic detection circuits 114, and generates an output signal on node 115*e* coupled to the switch 117 in response to a malfunction of the trip circuit 111, the power supply 113, the sensors 116, or the electronic detection circuits 114. The optional watchdog circuit 199 may be configured to monitor the self-test module 115 and generate an output signal on node 115*e* coupled to the switch 117 should the self-test module 115 stop functioning or malfunction. The output signal on node 115*e* causes the switch 117 to close disposing the heating element 118 contained in the temperature activated, permanent lock out trip mechanism 109 between the hot conductor 101 and the neutral conductor 102. The now energized heating element 118 contained in the temperature activated, permanent lock out trip mechanism 109 rapidly heats the temperature activated mechanism.

As described above, the temperature activated, permanent lock out trip mechanism 109 upon reaching a predefined temperature generates a force capable of moving an armature that unlatches the latch releasing a spring to open the main contactor switch 103 removing power from the electrical circuit. Once activated, the temperature activated, permanent lock out trip mechanism 109 inhibits the latch from latching which prevents a reset of the circuit interrupting device 200. Thus, the circuit interrupting device 200 is permanently disabled and power can no longer be reconnected to the electrical circuit.

Figure 3:
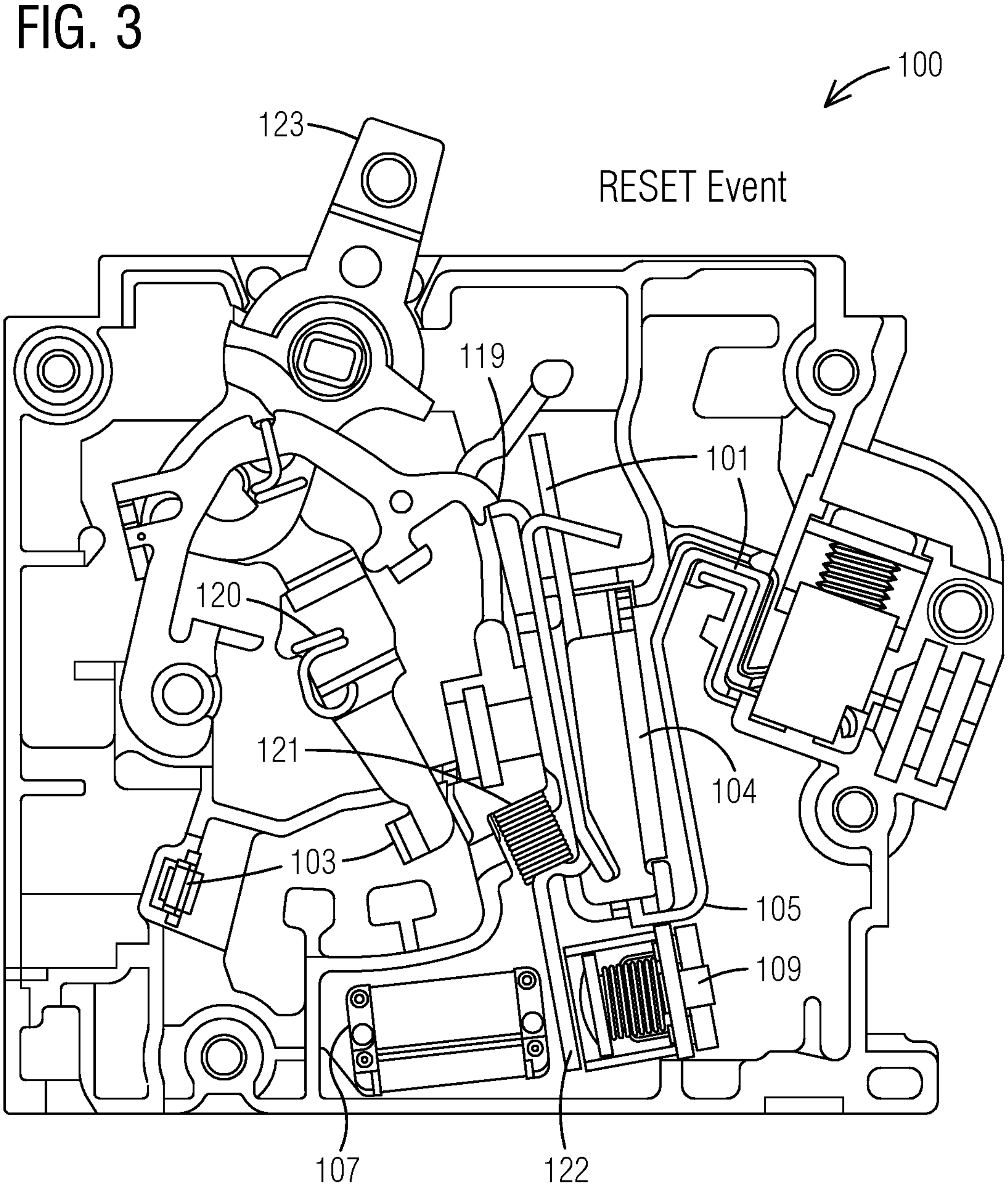
FIG. 3 illustrates the embodiment in its mechanical form when the circuit interrupting device is in a "Reset" state in accordance with an exemplary embodiment of the present invention.

Turning now to FIG. 3, it illustrates the embodiment in its mechanical form when the circuit interrupting device 100 is in a "Reset" state in accordance with an exemplary embodiment of the present invention. In the "Reset" state, the main contactor switch 103 is open and a latch 119 is latched loading a spring 120 of the main contactor. This is accomplished by moving a handle 123 from the "Tripped" position shown in FIG. 5 to the "Reset" position in FIG. 3. A different spring 121 holds a trip armature 122 in place.

Figure 4:
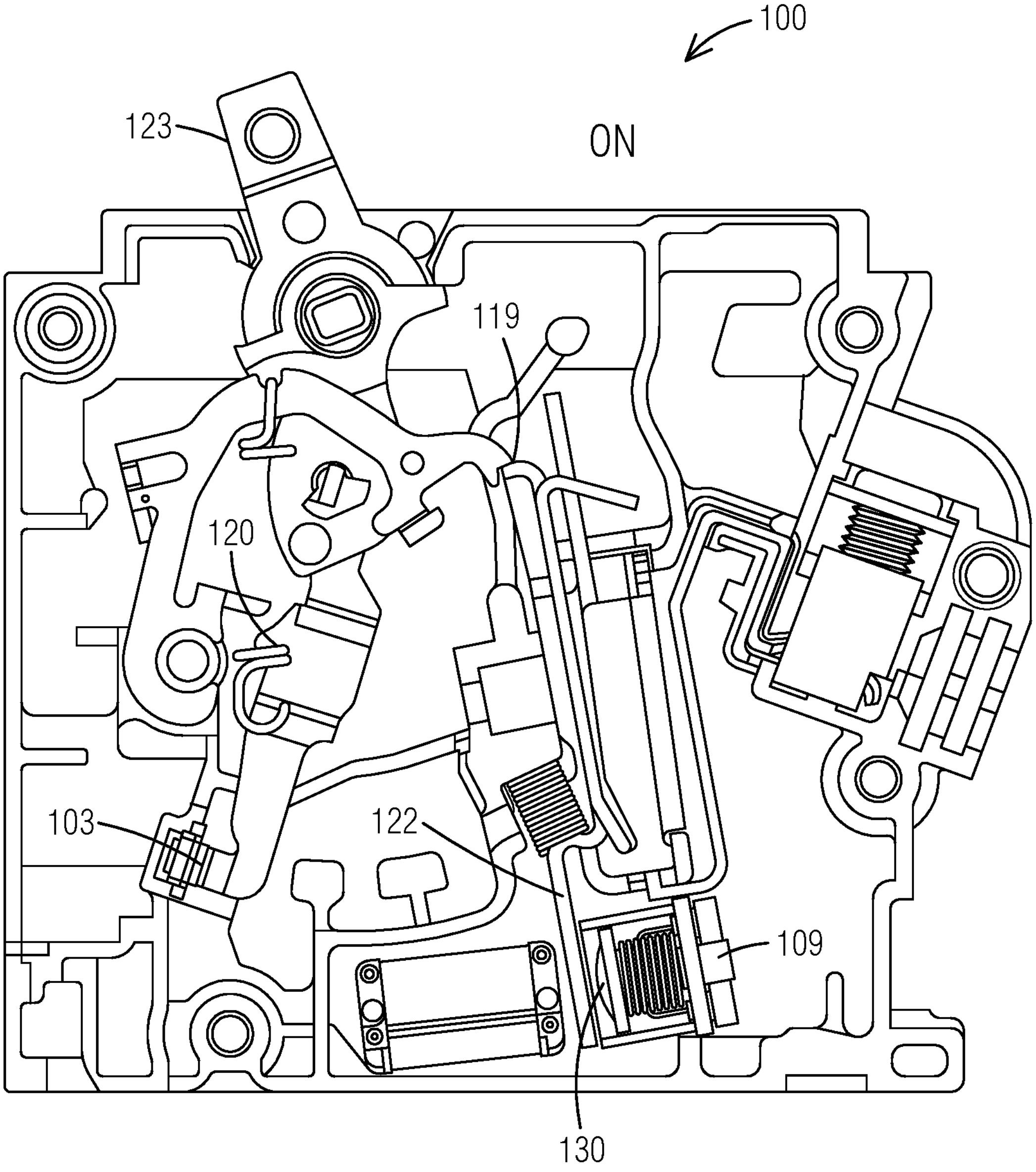
FIG. 4 illustrates the embodiment in its mechanical form when the circuit interrupting device is in an "On" state in accordance with an exemplary embodiment of the present invention.

FIG. 4 illustrates the embodiment in its mechanical form when the circuit interrupting device 100 is in an "On" state in accordance with an exemplary embodiment of the present invention. In the "On" state, the main contactor switch 103 is closed by moving the handle 123.

Figure 5:
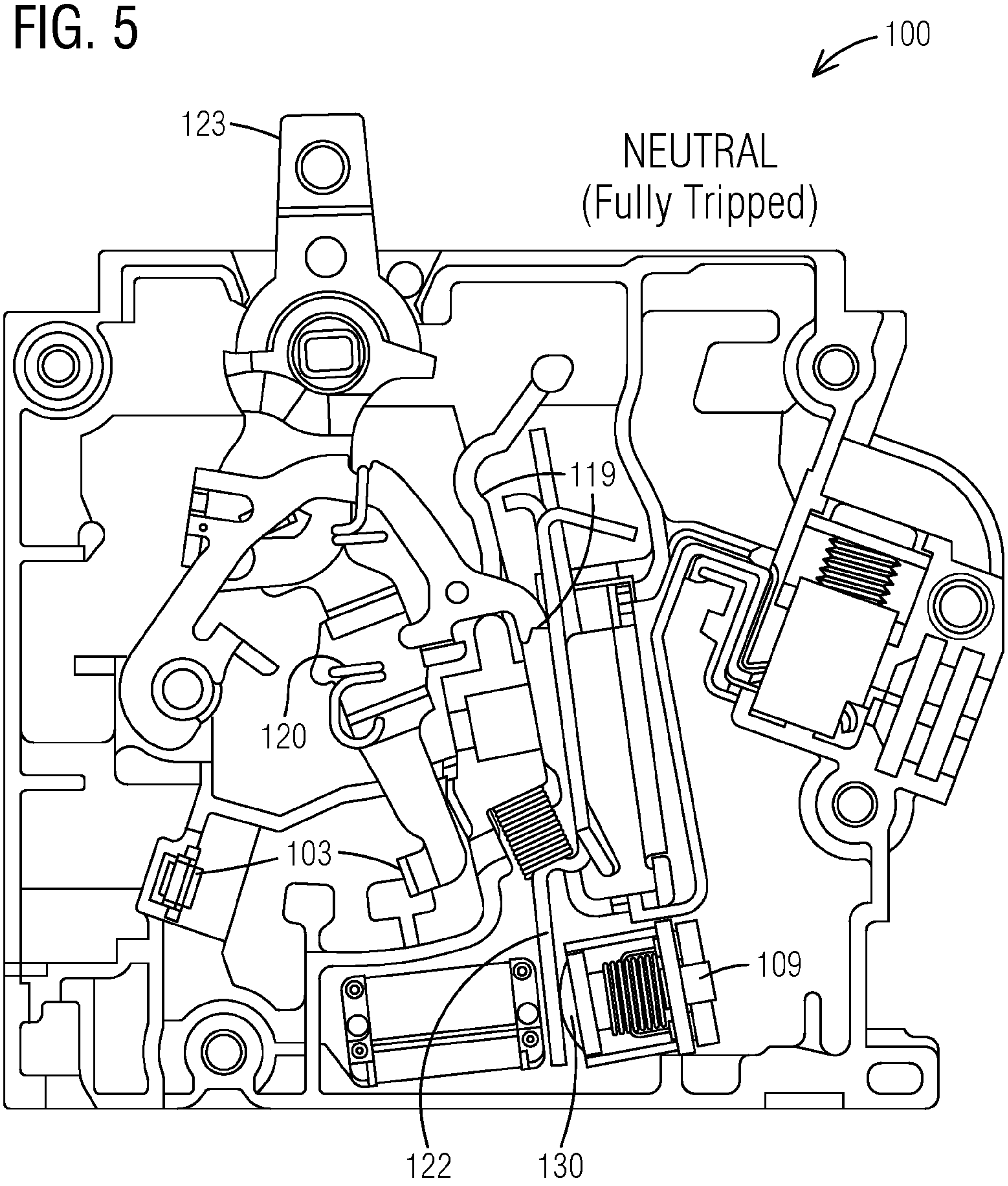
FIG. 5 illustrates the embodiment in its mechanical form when the circuit interrupting device is in a "Tripped" state in accordance with an exemplary embodiment of the present invention.

As seen in FIG. 5, it illustrates the embodiment in its mechanical form when the circuit interrupting device 100 is in a "Tripped" state in accordance with an exemplary embodiment of the present invention. The circuit interrupting device 100 is in the "Tripped" state as a result of the temperature activated, permanent lock out trip mechanism 109 being activated. The temperature activated, permanent lock out trip mechanism 109 is shown exerting force on the trip armature 122 which unlatched the latch 119 releasing the spring 120 of the main contactor switch 103 which opens and moves the handle 123 to the "Tripped" position. The continuous force exerted by the temperature activated, permanent lock out trip mechanism 109 on the trip armature 122 prevents the latch 119 from latching when attempting to "reset" the circuit interrupting device 100 by moving the handle 123 to the "Reset" position.

Paragraph 7.1.2. in UL489 describes a calibration test for a circuit breaker. So for the 200 percent calibration test and the 135 percent calibration test which are performed at 25° C. ambient temperature, a 15 A to 30 A rated circuit breaker must trip within 2 minutes while carrying 200 percent of its rated current, and within 1 hour while carrying 135 percent of its rated current. And for the 100 percent calibration test which is performed at 40° C. ambient temperature, the circuit breaker shall not trip while carrying 100 percent of its rated current until its temperatures have stabilized.

Figure 6:
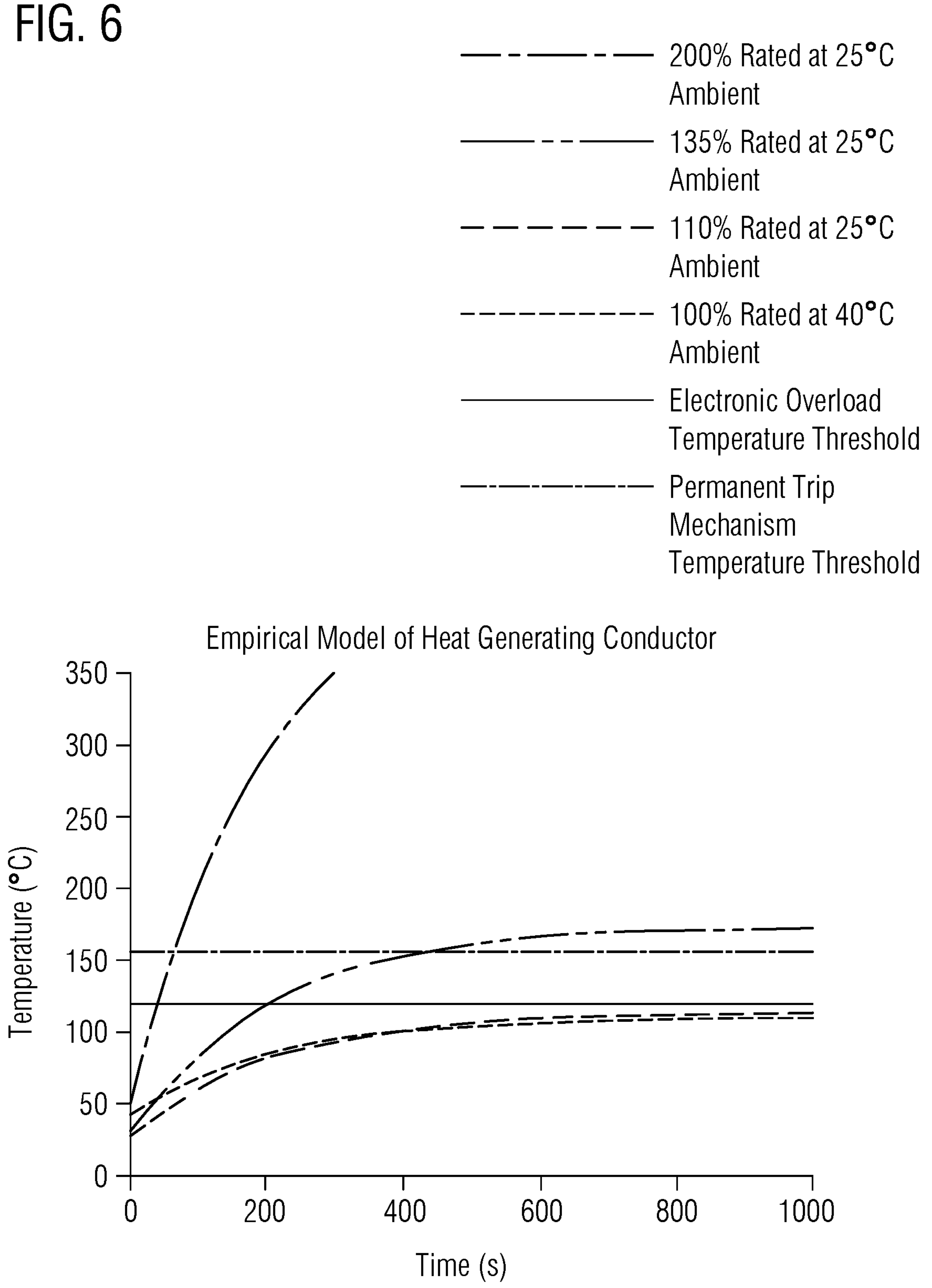
FIG. 6 illustrates an empirical model of the temperature vs. time characteristic of a conductor capable of generating heat section of a 20 A rated circuit breaker during the various calibration tests in accordance with an exemplary embodiment of the present invention.

As shown in FIG. 6, it illustrates an empirical model of the temperature vs. time characteristic of the conductor capable of generating heat section 105 of a 20 A rated circuit breaker during the various calibration tests in accordance with an exemplary embodiment of the present invention. The predetermined threshold of the electronic overload current detection circuit 114 is set to correspond to a temperature of approximately 120° C. to achieve a trip time of approximately 55 seconds while carrying 200 percent of its rated current (25° C. ambient), a trip time of approximately 3.5 minutes while carrying 135 percent of its rated current (25° C. ambient), and to not trip while carrying 100 percent of its rated current (40° C. ambient), which are well within the test limits described in UL489. The predetermined threshold of the temperature activated, permanent lock out trip mechanism 109 is set to a higher temperature of approximately to 157° C. to achieve a trip time of approximately 81 seconds while carrying 200 percent of its rated current (25° C. ambient), a trip time of approximately 7.4 minutes while carrying 135 percent of its rated current (25° C. ambient), and to not trip while carrying 100 percent of its rated current (40° C. ambient), which also are well within the test limits described in UL489.

Figure 7:
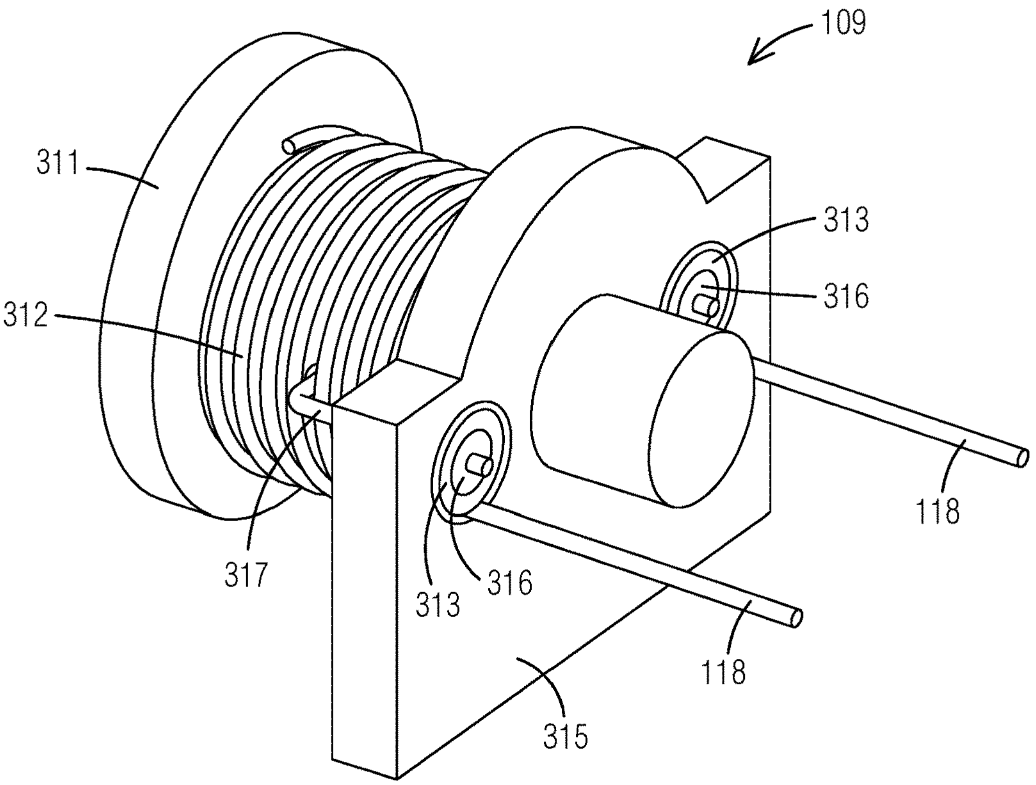
FIG. 7 illustrates a temperature-activated, permanent lock out trip mechanism in accordance with an exemplary embodiment of the present invention.

In FIG. 7, it illustrates the temperature-activated, permanent lock out trip mechanism 109 in accordance with an exemplary embodiment of the present invention. The temperature activated permanent lock out trip mechanism 109 consists of a plunger 311, a spring 312, at least one solder holding tube 313, a fusible metal such as solder 316, a holding wire 317, a heating element 118, and a base 315. The spring 312 is compressed by the plunger 311 against the base 315 which can be integrated into an enclosure of the circuit interrupting device 100. The plunger 311 is held in place by the holding wire 317 that is affixed to the base 315 by the solder 316 in at least one solder holding tube 313. The trip armature 122 as shown in FIG. 3 and FIG. 5 is configured to unlatch the latch 119 when a force is applied by the plunger 311 releasing the spring 120 to open the main contactor switch 103 removing power from the electrical circuit. The base 315 which can be integrated into the enclosure for the circuit interrupting device 100 holds the temperature activated, permanent lock out trip mechanism 109 in place and provides a fixed-point reference for the spring force of the spring 312 in the temperature activated, permanent lock out trip mechanism 109. There are a variety of fusible metals and metal alloys 316 commercially available with various precise melting points ranging from approximately 90° C. to 450° C. 'Indium 100' is the fusible metal selected for this embodiment because it has a precise melting point of 157° C. When the temperature of the solder 316 reaches its melting point, the solder becomes a liquid and is no longer affixed to the holding wire 317 allowing the plunger 311 to move in the direction of the trip armature 122. The force of the compressed spring 312 against the fixed reference of the enclosure or base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5. The top of the cap of the plunger 311 has a rounded bump 130 shown in FIG. 4 and FIG. 5 that allows for a tangential plane to contact the trip armature 122 to apply a force normal to a plane.

Figure 8:
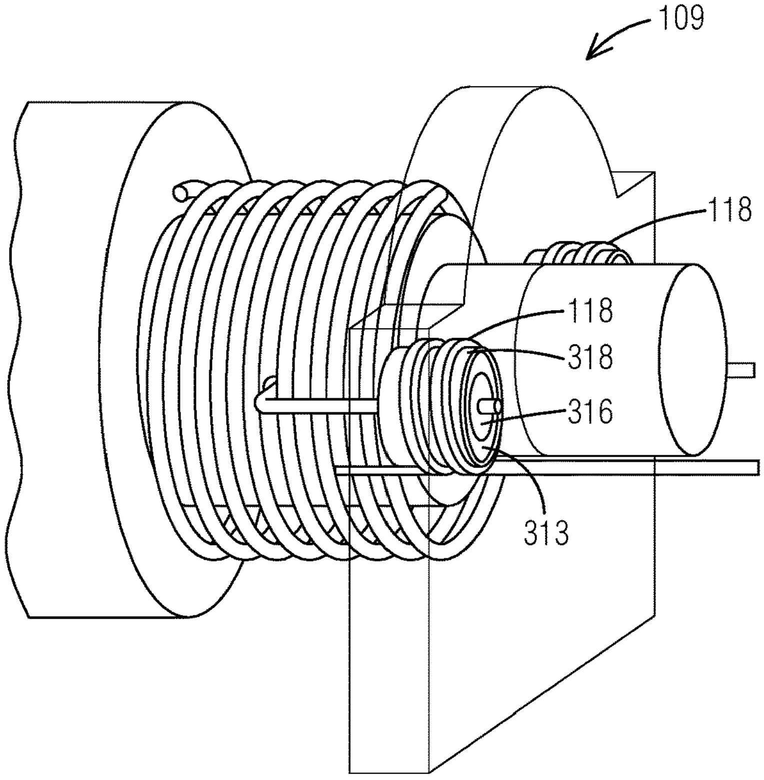
FIG. 8 illustrates an alternative view of the temperature-activated, permanent lock out trip mechanism with a base being transparent in accordance with an exemplary embodiment of the present invention.

With regard to FIG. 8, it illustrates an alternative view of the temperature-activated, permanent lock out trip mechanism 109 with the base 315 being transparent in accordance with an exemplary embodiment of the present invention. As stated previously in the description of FIG. 2, the self-test module 115 generates an output on node 115*e* coupled to the switch 117 in response to a malfunction of the trip circuit 111, the power supply 113, the sensors 116, or the electronic detection circuits 114. The output signal causes the switch 117 to close disposing the heating element 118 contained in the temperature activated, permanent lock out trip mechanism 109 between the hot conductor 101 and the neutral conductor 102. The heating element 118, which can optionally be electrically isolated from the solder-holding tube 313 by electrical insulation 318, rapidly heats the solder 316 to its melting temperature of 157° C., typically in less than one second. When the temperature of the solder 316 reaches its melting point, the solder becomes a liquid and is no longer affixed to the holding wire 317 allowing the plunger 311 to move in the direction of the trip armature 122. The force of the compressed spring 312 against the fixed reference of the enclosure or base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5.

In both embodiments of the circuit interrupting devices 100 and 200, the temperature activated, permanent lock out trip mechanism 109 is strategically located near the section of conductor 105 that generates heat so that in the event of a hazardous overload current condition in the electrical circuit, and the failure of the current sensor 116 or the electronic overload detection circuit 114, and the failure of the self-test module 115 or the trip circuit 111, the solder 316 heats up and reaches its melting point. The solder 316 becomes a liquid and is no longer affixed to the holding wire 317 allowing the plunger 311 to move in the direction of the trip armature 122. The force of the compressed spring 312 against the fixed reference of the enclosure or base 315 and the cap of the plunger 311 moves the plunger 311 in the direction of a trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5. Thus, the circuit interrupting device 100 still meets UL489 even when the electronics are no longer functioning properly. See FIG. 6 and paragraph describing FIG. 6 above.

Figure 9:
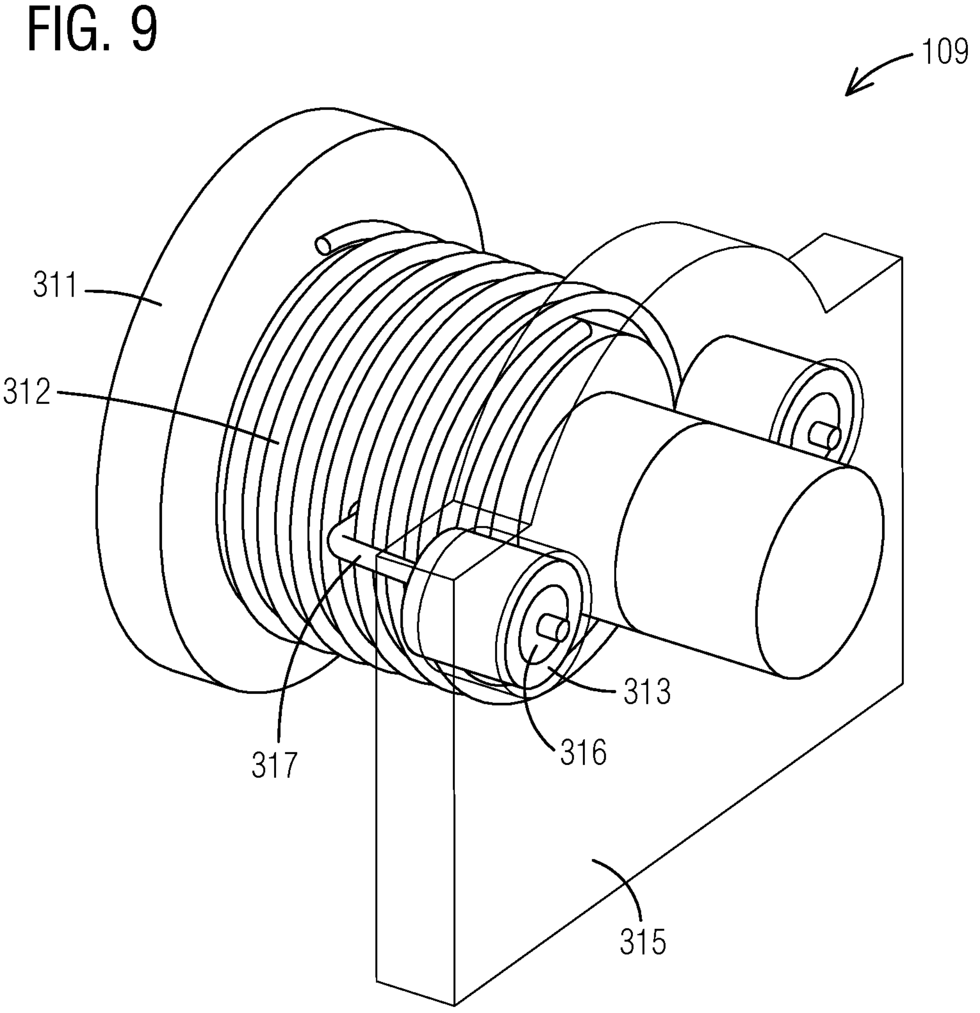
FIG. 9 illustrates an alternate embodiment of the temperature-activated, permanent lock out trip mechanism contained in this alternate embodiment of a circuit interrupting device in accordance with an exemplary embodiment of the present invention.
Figure 10:
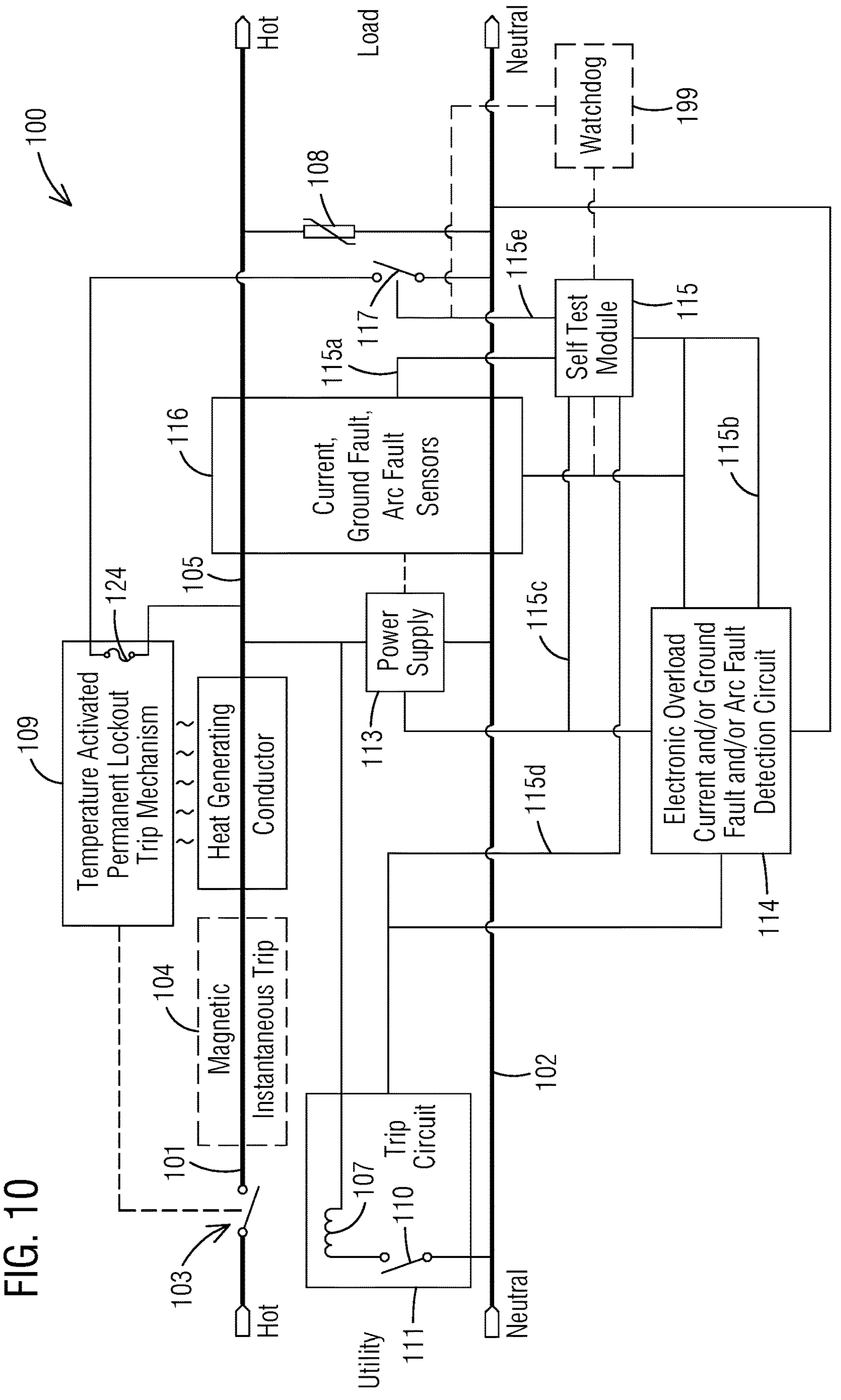
FIG. 10 illustrates another alternate embodiment similar to that of FIG. 2 in accordance with an exemplary embodiment of the present invention.

With respect to FIG. 9, it illustrates an alternate embodiment of the temperature-activated, permanent lock out trip mechanism 109 contained in this alternate embodiment of a circuit interrupting device in accordance with an exemplary embodiment of the present invention. FIG. 10 illustrates another alternate embodiment similar to that of FIG. 2 in accordance with an exemplary embodiment of the present invention.

FIGS. 7 and 8 describe a device such as the temperature-activated, permanent lock out trip mechanism 109 in which there is at least one heating element when energized in response to a failed self-test that melts the solder 316 inside the holding tube 313 that releases the holding wire 317. FIG. 9 describes the temperature-activated, permanent lock out trip mechanism 109 in which there a heating element is not present, but where the holding wire 317 fuses when energized in response to a failed self-test.

Another alternate embodiment similar to that of FIG. 2 is shown in FIG. 10. In this alternate embodiment, the heating element 118 in the temperature activated, permanent lock out trip mechanism 109 is replaced by a fusible device 124. Recall that the self-test module 115 is configured to continuously and or periodically check the functionality of the trip circuit 111, the power supply 113, the sensors 116, and the electronic detection circuits 114, and generates an output signal on node 115*e* coupled to the switch 117 in response to a malfunction of the trip circuit 111, the power supply 113, the sensors 116, or the electronic detection circuits 114.

The optional watchdog circuit 199 may be configured to monitor the self-test module 115 and generate an output signal on node 115*e* coupled to the switch 117 should the self-test module 115 stop functioning or malfunction. In this embodiment, the output signal on node 115*e* causes the switch 117 to close disposing the fusible device 124 contained in the temperature activated, permanent lock out trip mechanism 109 between the hot conductor 101 and the neutral conductor 102. The now energized fusible device 124 contained in the temperature activated, permanent lock out trip mechanism 109 rapidly heats and melts.

An alternate embodiment of the temperature activated, permanent lock out trip mechanism 109 contained in this alternate embodiment of circuit interrupting device 100 is described in FIG. 9. The temperature activated, permanent lock out trip mechanism 109 consists of the plunger 311, the spring 312, at least one solder holding tube 313, fusible metal such as the solder 316, the fusible holding wire 319 which is the fusible device 124 shown in FIG. 10, and the base 315. The spring 312 is compressed by the plunger 311 against the base 315 which can be integrated into the enclosure of the circuit interrupting device 100. The plunger 311 is held in place by the fusible holding wire 319 that is affixed to the base 315 by the solder 316 in at least one solder holding tube 313.

In this embodiment the fusible holding wire 319 shown in FIG. 9 is composed of a fusible metal such as stainless steel. When energized, the fusible holding wire 319 quickly melts allowing the plunger 311 to move in the direction of the trip armature 122. The force of the compressed spring 312 against the fixed reference of the enclosure or base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5.

As with the previous embodiment of the circuit interrupting device 100, the temperature activated, permanent lock out trip mechanism 109 is strategically located near the section of conductor 105 that generates heat so that in the event of a hazardous overload current condition in the electrical circuit, and the failure of the current sensor 116 or electronic overload detection circuit 114, and the failure of the self-test module 115 or the trip circuit 111, the solder 316 heats up and reaches its melting point. The solder 316 becomes a liquid and is no longer affixed to the holding wire 317 allowing the plunger 311 to move in the direction of the trip armature 122. The force of the compressed spring 312 against the fixed reference of the enclosure or the base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5. Thus, the circuit interrupting device 100 still meets UL489 even when the electronics are no longer functioning properly. See FIG. 6 and the paragraph describing FIG. 6 above.

Figure 11:
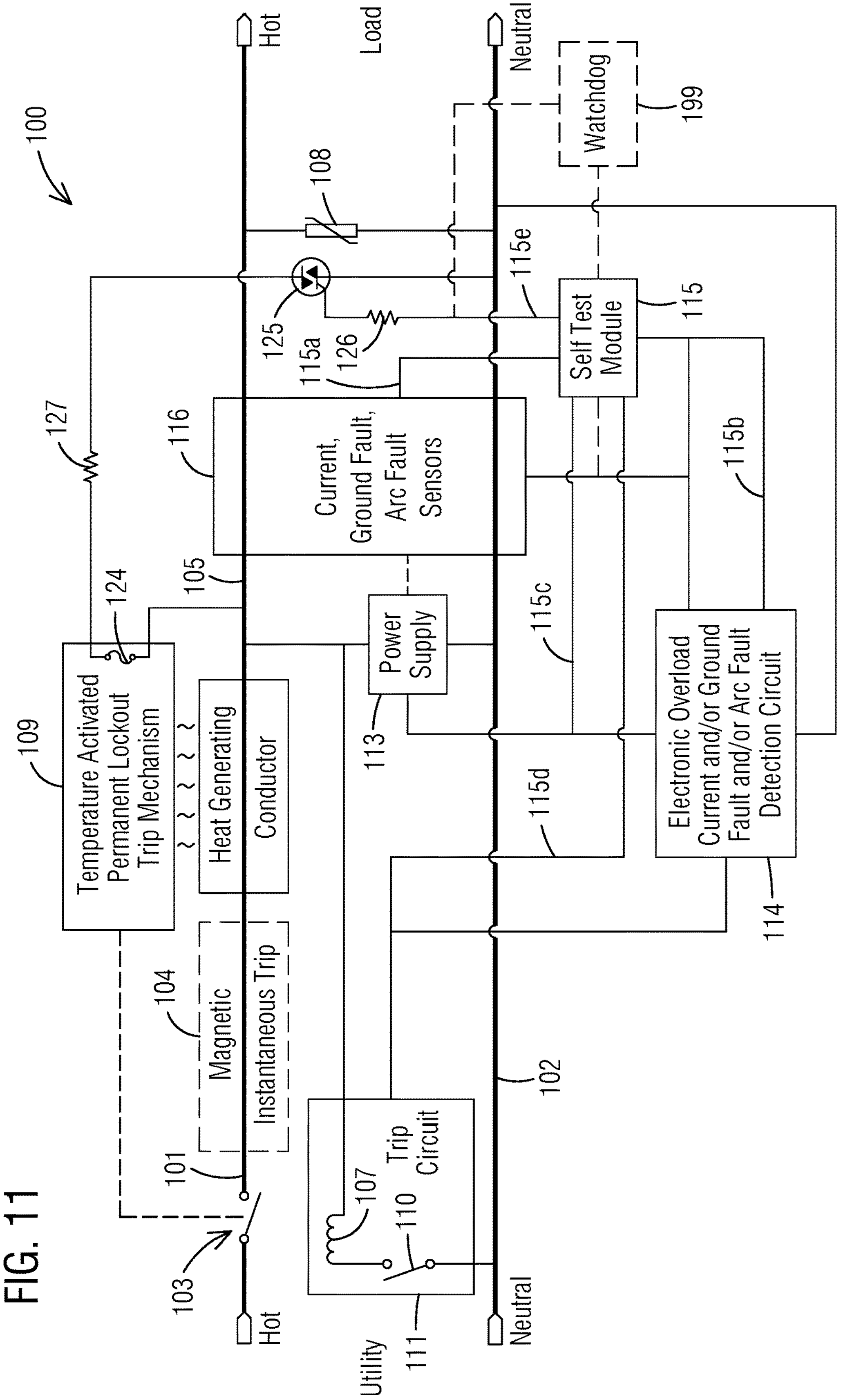
FIG. 11 illustrates a circuit interrupting device similar to the embodiment shown in FIG. 10 in accordance with an exemplary embodiment of the present invention.
Figure 12:
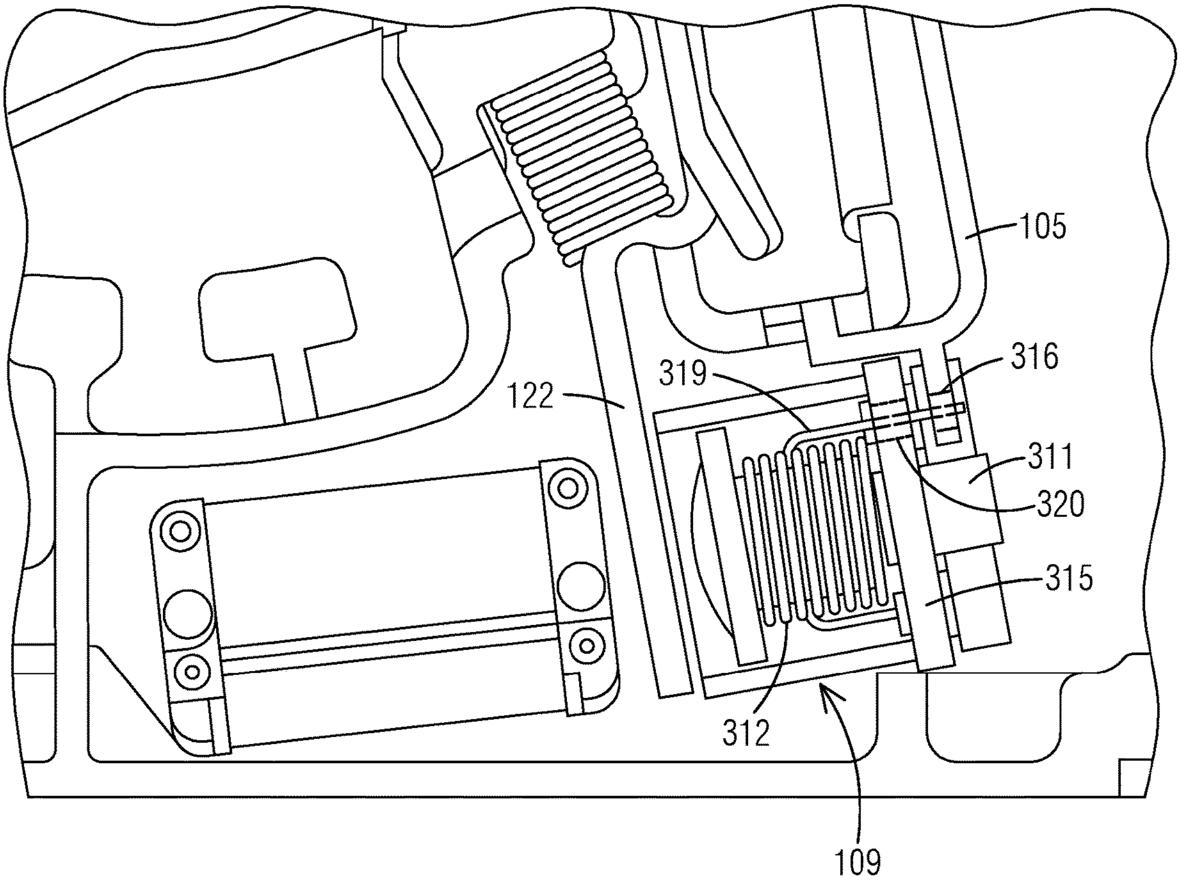
FIG. 12 illustrates another alternate embodiment of the temperature-activated, permanent lock out trip mechanism contained in this alternate embodiment of a circuit interrupting device in accordance with an exemplary embodiment of the present invention.

FIG. 11 illustrates a circuit interrupting device similar to the embodiment shown in FIG. 10 in accordance with an exemplary embodiment of the present invention. FIG. 12 illustrates another alternate embodiment of the temperature-activated, permanent lock out trip mechanism 109 contained in this alternate embodiment of a circuit interrupting device in accordance with an exemplary embodiment of the present invention.

Another alternate embodiment of the temperature activated, permanent lock out trip mechanism 109 contained in this alternate embodiment of the circuit interrupting device 100 is described in FIG. 12. The temperature activated, permanent lock out trip mechanism 109 consists of the plunger 311, the spring 312, the fusible metal such as the solder 316, the fusible holding wire 319 which is the fusible device 124 shown in FIG. 10 10, and the base 315. The spring 312 is compressed by the plunger 311 against the base 315 which can be integrated into the enclosure of the circuit interrupting device 100. The plunger 311 is held in place by the fusible holding wire 319 that has one end affixed to the base 315 by any means and the other end freely passes through a hole/slot 320 in the base 315 and is affixed to the section of heating conductor 105 by the solder 316.

In this embodiment the fusible holding wire 319 shown in FIG. 12 is composed of a fusible metal such as stainless steel. When energized, the fusible holding wire 319 quickly melts allowing the plunger 311 to move in the direction of the trip armature 122. The force of the compressed spring 312 against the fixed reference of the enclosure or the base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5.

So in this embodiment of the circuit interrupting device 100, the fusible holding wire 319 in the temperature activated, permanent lock out trip mechanism 109 is strategically soldered to the section of conductor 105 that generates heat so that in the event of a hazardous overload current condition in the electrical circuit, and the failure of the current sensor 116 or the electronic overload detection circuit 114, and the failure of the self-test module 115 or the trip circuit 111, the solder 316 heats up and reaches its melting point. The solder 316 becomes a liquid and is no longer affixed to the fusible holding wire 319 allowing the plunger 311 to move in the direction of the trip armature 122. The force of the compressed spring 312 against the fixed reference of the enclosure or the base 315 and the cap of the plunger 311 moves the plunger 311 in the direction of the trip armature 122 and applies a continuous force on the trip armature 122 as shown in FIG. 4. The applied force moves the trip armature 122 that unlatches the latch 119 releasing the spring 120 to open the main contactor switch 103 removing power from the electrical circuit. The continuous force applied to the trip armature 122 inhibits the latch 119 from latching which permanently prevents a reset, disabling the main contactor switch 103 from ever closing again and reconnecting power to the electrical circuit as shown in FIG. 5. Thus, the circuit interrupting device 100 still meets UL489 even when the electronics are no longer functioning properly. See FIG. 6 and the paragraph describing FIG. 6 above.

The embodiment of the circuit interrupting device 100 shown in FIG. 11 is similar to the embodiment shown in FIG. 10 except the switch 117 to close disposing the fusible device 124 contained in the temperature activated, permanent lock out trip mechanism 109 between the hot conductor 101 and the neutral conductor 102 is replaced with an electronic switch 125 optionally in series with a resistance 127. The electronic switch 125 can be various semiconductor or solid-state devices such as a transistor, TRIAC or SCR. In this embodiment, the electronic switch 125 is a TRIAC with part number Z0103NA5AL2 manufactured by STMicroelectronics. The resistance 127 is set to a value that sets the current to a desired amplitude to melt the fusible holding wire 319 in FIG. 9. The output signal from the self-test module 115 or the optional watchdog circuit 199 on node 115*e* is coupled to the gate of the TRIAC through a resistance 126 which has a typical value greater than 100 Ohms.

Figure 13:
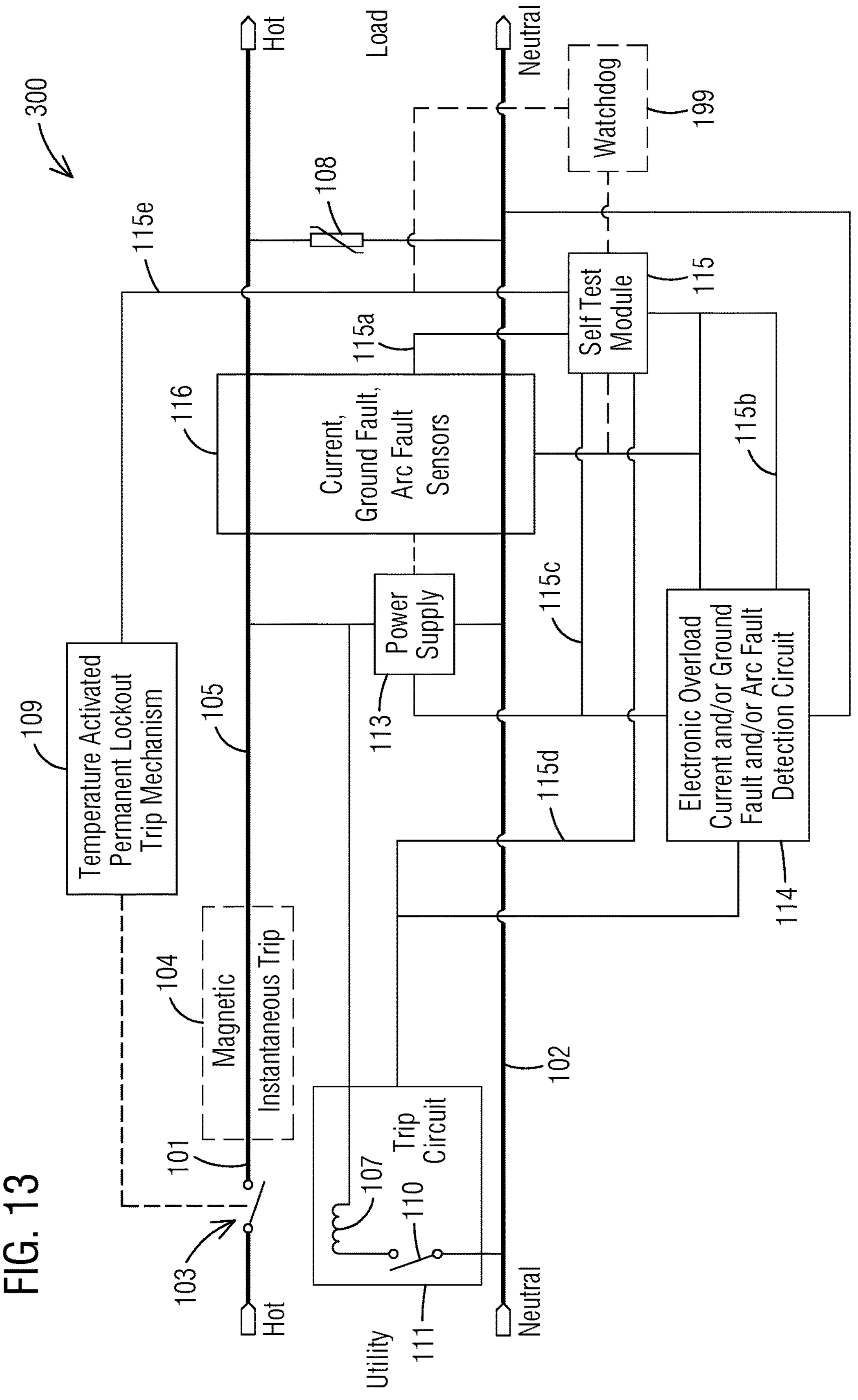
FIG. 13 illustrates another embodiment that does not include a section of a conductor that is intentionally configured to generate heat in accordance with an exemplary embodiment of the present invention.

FIG. 13 illustrates another embodiment that does not include the section of a conductor 105 that is intentionally configured to generate heat in accordance with an exemplary embodiment of the present invention. Therefore, in the case that a hazardous overload current and the trip circuit solenoid or electromagnet 107 or a solid-state switch became damaged and/or inoperable, or should the current sensor 116 or the electronic overload current detection circuit/apparatus 114 become damaged or inoperable, this embodiment may or may not generate a force to unlatch the latch 119 releasing the spring 120 to open the main contactor switch 103 removing power from the electrical circuit within the calibration trip time limits specified in UL489. This alternate embodiment shown in FIG. 13 describes a circuit interrupting device 300 that consists of the hot conductor 101, the main contactor switch 103 that is spring loaded but held in a closed switch position using the latch 119, the optional electromagnetic device 104 configured to instantaneously generate a magnetic force capable of unlatching the latch 119 releasing the spring 120 to open the main contactor switch 103 removing power from the electrical circuit when a hazardous overload current exceeds 800% of rated load current. And the trip circuit 111 in the form of the solenoid or electromagnet 107 such that when the switch 110 is closed the solenoid 107 is disposed across the hot conductor 101 and a connection to the neutral conductor 102.

And further includes an electronic overload current detection and/or ground fault detection and/or arc fault detection circuit 114 with the corresponding sensor and/or sensors 116, the self-test or auto-monitoring module 115, the power supply 113, and the temperature activated, permanent lock out trip mechanism 109 located in close proximity to the section of conductor 105 that generates heat. The power supply 113 supplies appropriate voltage and current to the electronic detection circuit 114 and the self-test module 115 and/or the sensor or sensors 116 from the hot conductor 101. The sensors 116 are configured to sense vibration and or heat, or sense voltage and or current on conductor 101 and or conductor 102 whose output is coupled to the electronic detection circuit 114. The electronic detection circuit 114 is configured to receive the sensors 116 output, processes the data to determine if there exists an overload current fault and/or a ground fault and or a grounded neutral fault and/or an arc fault.

Upon determination of a hazardous condition, a trip signal is output to the trip circuit 111 which closes the switch 110 that energizes the solenoid 107 producing a magnetic force capable of moving an armature that unlatches the latch 119 releasing the spring 120 to open the main contactor switch 103 removing power from the electrical circuit. The temperature activated, permanent lock out trip mechanism 109 upon reaching a predefined temperature also generates a force capable of moving an armature that unlatches the latch 119 releasing the spring 120 to open the main contactor switch 103 removing power from the electrical circuit.

Once activated, the temperature activated, permanent lock out trip mechanism 109 inhibits the latch 119 from latching which prevents a reset of the circuit interrupting device 300. Thus, the circuit interrupting device 300 is permanently disabled and power can no longer be reconnected to the electrical circuit.

The self-test module 115 typically generates output stimuli on the node 115*a* coupled to the sensor(s) 116 and monitors the electronic detection circuit 114 output on the node 115*b* for a malfunction, or monitors for a trip signal on the node 115*d* while disabling the trip circuit 111. Alternatively, the self-test module 115 may monitor the health of the sensor(s) 116 directly or by some other indirect means. In addition, the self-test module 115 may monitor the trip circuit 111 on the node 115*d* for a malfunction in response to a stimulus provided by the self-test module 115 directly or indirectly through the electronic detection circuit 114 while ensuring the trip circuit 111 does not completely energize and trip the circuit interrupting device 300.

Alternatively, the self-test module 115 may monitor the electronic detection circuit 114 directly or by some other indirect means. And the self-test module 115 typically monitors the power supply 113 output voltage and or current on the node 115*c* for a malfunction.

Regardless of the exact configuration, the self-test module 115 is configured to continuously and or periodically check the functionality of the trip circuit 111, the power supply

113, the sensors 116, and the electronic detection circuits 114, and generate an output signal on the node 115*e* coupled to the solid state switch 125 in response to a malfunction of the trip circuit 111, the power supply 113, the sensors 116, or the electronic detection circuits 114.

The optional watchdog circuit 199 may be configured to monitor the self-test module 115 and generate an output signal on the node 115*e* coupled to the solid state switch 125 should the self-test module 115 stop functioning or malfunction. This output signal on node 115*e* from the self-test module 115 is configured to energize a heating device contained in the temperature activated, permanent lock out trip mechanism 109. As described above, the temperature activated, permanent lock out trip mechanism 109 upon reaching a predefined temperature generates a force capable of moving an armature that unlatches the latch 119 releasing the spring 120 to open the main contactor switch 103 removing power from the electrical circuit. Once activated, the temperature activated, permanent lock out trip mechanism 109 inhibits the latch 119 from latching which prevents a reset of the circuit interrupting device 300. Thus, the circuit interrupting device 300 is permanently disabled and power can no longer be reconnected to the electrical circuit.

The circuit interrupting device 100 comprises a conductor capable of generating heat and the temperature-activated, permanent lock out trip mechanism 109. The temperature-activated, permanent lock out trip mechanism 109 includes: a plunger, a compressed or stretched spring and a fusible metal to hold the plunger in place that has a constant force exerted on it by either the compressed or stretched spring. The temperature-activated, permanent lock out trip mechanism is located near the conductor that generates heat and is configured such that when the fusible metal melts the plunger is released: allowing the compressed or stretched spring to convert its potential energy into kinetic energy and moving the plunger to generate a force to unlatch a latch releasing a first spring to open a contactor switch removing power from an electrical circuit. The constant force generated by the compressed or stretched spring on the plunger inhibits the circuit interrupting device from resetting which permanently prevents reconnecting power to the electrical circuit.

In one embodiment, the temperature-activated, permanent lock out trip mechanism 109 consists of: at least one solder holding tube, a holding wire, a heating element and a base. The compressed or stretched spring is compressed by the plunger against the base which is integrated into an enclosure of the circuit interrupting device. The plunger is held in place by the holding wire that is affixed to the base by the fusible metal in at least one solder holding tube. The base provides a fixed-point reference for the spring force of the compressed or stretched spring in the temperature-activated permanent lock out trip mechanism.

The circuit interrupting device 100 further comprises the trip armature 122 configured to unlatch the latch 119 when force is applied by the plunger 311 releasing the first spring 120 to open the contactor switch 103 removing power from the electrical circuit. When the temperature of the fusible metal 316 reaches its melting point, the fusible metal becomes a liquid and is no longer affixed to the holding wire allowing the plunger to move in the direction of the trip armature. The force of the compressed or stretched spring against the fixed-point reference of the enclosure or the base and a cap of the plunger moves the plunger in the direction of the trip armature and applies a continuous force on the trip armature such that the applied continuous force moves the trip armature that unlatches the latch releasing the first spring to open the contactor switch thus removing power from the electrical circuit. The continuous force applied to the trip armature inhibits the latch from latching which permanently prevents a reset, disabling the contactor switch from ever closing again and reconnecting power to the electrical circuit. A top of the cap of the plunger has a rounded bump that allows for a tangential plane to contact the trip armature to apply a force normal to a plane.

The temperature-activated, permanent lock out trip mechanism is configured to generate a force to unlatch the latch releasing the first spring to open the contactor switch removing power from the electrical circuit in response to a malfunction detected in a trip circuit, or a power supply, or sensors, or any of electronic detection circuits such that the temperature-activated, permanent lock out trip mechanism permanently prevents the circuit interrupting device 100 from being turned back on and re-applying power to the electrical circuit. The temperature-activated, permanent lock out trip mechanism is configured to generate a force to unlatch the latch releasing the first spring to open the contactor switch removing power from the electrical circuit within calibration trip time limits specified in UL489 should a trip circuit solenoid or electromagnet or a solid-state switch became damaged and/or inoperable, or should a current sensor or an electronic overload current detection circuit/apparatus become damaged or inoperable, or should a self-test module or a watchdog circuit becomes inoperable.

The circuit interrupting device further comprises the heating elements 118 surrounding the fusible metal that is energized in response to a malfunction in a trip circuit, a power supply, sensors, or electronic detection circuits, which melts the fusible metal releasing the plunger allowing the compressed or stretched spring to convert potential energy into kinetic energy, moving the plunger to generate a force to unlatch the latch releasing the first spring to open the contactor switch removing power from the electrical circuit. The fusible metal is energized to generate heat in response to a malfunction in a trip circuit, a power supply, sensors, or electronic detection circuits, which melts the fusible metal releasing the plunger allowing the compressed or stretched spring to convert potential energy into kinetic energy, moving the plunger to generate a force to unlatch the latch releasing the first spring to open the contactor switch removing power from the electrical circuit.

The circuit interrupting device further comprises a fail-safe backup mechanism to permanently remove power from the electrical circuit within the calibration trip time limits specified in UL489 should a trip circuit, a current sensor, or an electronic overload current detection circuit/apparatus become damaged or inoperable, or should a self-test module or a watchdog circuit becomes inoperable and or the fail-safe backup mechanism to permanently remove power from the electrical circuit in response to a malfunction in the trip circuit, a power supply, sensors, or any of the electronic detection circuits.

In one embodiment, a self test of an overload current fault detection circuit and or sensors is provided. Likewise, a self test of a ground fault detection circuit and or sensors is provided and a self test of an arc fault detection circuit and or sensors is provided. In addition, a self test of a trip circuit is provided.

The circuit interrupting device further comprises a switch to dispose the fusible metal 316 across the hot conductor 105 and the neutral conductor 102. The switch may be a solid-state device such as a Triac or a SCR.

FIG. 14 illustrates a schematic view of a flow chart of a method 1400 of providing a fail-safe lock out trip mechanism for the circuit interrupting device 100 in response to a self-test in accordance with an exemplary embodiment of the present invention. Reference is made to the elements and features described in FIGS. 1-13. It should be appreciated that some steps are not required to be performed in any particular order, and that some steps are optional.

The method 1400 comprises a step 1405 of providing a conductor capable of generating heat 105. The method 1400 further comprises a step 1410 of providing a temperature-activated, permanent lock out trip mechanism. The temperature-activated, permanent lock out trip mechanism includes a plunger, a compressed or stretched spring and a fusible metal to hold the plunger in place that has a constant force exerted on it by either the compressed or stretched spring. The temperature-activated, permanent lock out trip mechanism is located near the conductor that generates heat and is configured such that when the fusible metal melts the plunger is released: allowing the compressed or stretched spring to convert its potential energy into kinetic energy, and moving the plunger to generate a force to unlatch a latch releasing a first spring to open a contactor switch removing power from an electrical circuit. The constant force generated by the compressed or stretched spring on the plunger inhibits the circuit interrupting device 100 from resetting which permanently prevents reconnecting power to the electrical circuit.

While a helical, compression spring of an elastic body or device is described here a range of one or more other elastic bodies or devices are also contemplated by the present invention. For example, other mechanisms such as any elastic body or device that recovers its original shape when released after being distorted may be implemented based on one or more features presented above without deviating from the spirit of the present invention.

The techniques described herein can be particularly useful for different types of circuit breakers or circuit interrupting devices. While particular embodiments are described in terms of AFCI, GFCI breakers, the techniques described herein are not limited to such circuit breakers but can also be used with other circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A circuit interrupting device comprising:

a conductor capable of generating heat; and a temperature-activated, permanent lock out trip mechanism including:

a plunger;

a compressed or stretched spring; and a fusible metal to hold the plunger in place that has a constant force exerted on it by either the compressed or stretched spring, wherein the temperature-activated, permanent lock out trip mechanism is located near the conductor that generates heat and is configured such that when the fusible metal melts when at least one heating element is energized or a holding wire fuses when energized in response to a failed self-test the plunger is released:

allowing the compressed or stretched spring to convert its potential energy into kinetic energy, and moving the plunger to generate a force to unlatch a latch releasing a first spring to open a contactor switch removing power from an electrical circuit, wherein the constant force generated by the compressed or stretched spring on the plunger inhibits the circuit interrupting device from resetting which permanently prevents reconnecting power to the electrical circuit.

2. The circuit interrupting device of claim 1, wherein the temperature-activated, permanent lock out trip mechanism consists of:

at least one solder holding tube, the holding wire and the at least one heating element; and a base, wherein the compressed or stretched spring is compressed by the plunger against the base which is integrated into an enclosure of the circuit interrupting device, wherein the plunger is held in place by the holding wire that is affixed to the base by the fusible metal in at least one solder holding tube, and wherein the base provides a fixed-point reference for the spring force of the compressed or stretched spring in the temperature-activated permanent lock out trip mechanism.

3. The circuit interrupting device of claim 2, further comprising:

a trip armature configured to unlatch the latch when force is applied by the plunger releasing the first spring to open the contactor switch removing power from the electrical circuit, wherein when the temperature of the fusible metal reaches its melting point, the fusible metal becomes a liquid and is no longer affixed to the holding wire allowing the plunger to move in the direction of the trip armature, wherein the force of the compressed or stretched spring against the fixed-point reference of the enclosure or the base and a cap of the plunger moves the plunger in the direction of the trip armature and applies a continuous force on the trip armature such that the applied continuous force moves the trip armature that unlatches the latch releasing the first spring to open the contactor switch thus removing power from the electrical circuit.

4. The circuit interrupting device of claim 3, wherein the continuous force applied to the trip armature inhibits the latch from latching which permanently prevents a reset, disabling the contactor switch from ever closing again and reconnecting power to the electrical circuit.

5. The circuit interrupting device of claim 4, wherein a top of the cap of the plunger has a rounded bump that allows for a tangential plane to contact the trip armature to apply a force normal to a plane.

6. The circuit interrupting device of claim 1, wherein the temperature-activated, permanent lock out trip mechanism to generate a force to unlatch the latch releasing the first spring to open the contactor switch removing power from the electrical circuit in response to a malfunction detected in a trip circuit, or a power supply, or sensors, or any of electronic detection circuits such that the temperature-activated, permanent lock out trip mechanism permanently prevents the circuit interrupting device from being turned back on and re-applying power to the electrical circuit.

7. The circuit interrupting device of claim 1, further comprising:

heating elements surrounding the fusible metal that is energized in response to a malfunction in a trip circuit, a power supply, sensors, or electronic detection circuits, which melts the fusible metal releasing the plunger allowing the compressed or stretched spring to convert potential energy into kinetic energy, moving the plunger to generate a force to unlatch the latch releasing the first spring to open the contactor switch removing power from the electrical circuit.

8. The circuit interrupting device of claim 1, wherein the temperature-activated, permanent lock out trip mechanism to generate a force to unlatch the latch releasing the first spring to open the contactor switch removing power from the electrical circuit within calibration trip time limits specified in UL489 should a trip circuit solenoid or electromagnet or a solid-state switch became damaged and/or inoperable, or should a current sensor or an electronic overload current detection circuit/apparatus become damaged or inoperable, or should a self-test module or a watchdog circuit becomes inoperable.

9. The circuit interrupting device of claim 8, further comprising:

a fail-safe backup mechanism to permanently remove power from the electrical circuit within the calibration trip time limits specified in UL489 should a trip circuit, a current sensor, or an electronic overload current detection circuit/apparatus become damaged or inoperable, or should a self-test module or a watchdog circuit becomes inoperable and or the fail-safe backup mechanism to permanently remove power from the electrical circuit in response to a malfunction in the trip circuit, a power supply, sensors, or any of the electronic detection circuits.

10. The circuit interrupting device of claim 1, wherein the fusible metal is energized to generate heat in response to a malfunction in a trip circuit, a power supply, sensors, or electronic detection circuits, which melts the fusible metal releasing the plunger allowing the compressed or stretched spring to convert potential energy into kinetic energy, moving the plunger to generate a force to unlatch the latch releasing the first spring to open the contactor switch removing power from the electrical circuit.

11. The circuit interrupting device of claim 1, wherein a self test of an overload current fault detection circuit and or sensors is provided.

12. The circuit interrupting device of claim 1, wherein a self test of a ground fault detection circuit and or sensors is provided and wherein a self test of an arc fault detection circuit and or sensors is provided.

13. The circuit interrupting device of claim 1, wherein a self test of a trip circuit is provided.

14. The circuit interrupting device of claim 1, further comprising:

a switch to dispose the fusible metal across the conductor capable of generating heat and a neutral conductor.

15. The circuit interrupting device of claim 14, wherein the switch is a solid-state device including a Triac or a SCR.

16. A method of providing a fail-safe lock out trip mechanism for a circuit interrupting device in response to a self-test, the method comprising:

providing a conductor capable of generating heat; and providing a temperature-activated, permanent lock out trip mechanism including:

a plunger;

a compressed or stretched spring; and a fusible metal to hold the plunger in place that has a constant force exerted on it by either the compressed or stretched spring, wherein the temperature-activated, permanent lock out trip mechanism is located near the conductor that generates heat and is configured such that when the fusible metal melts when at least one heating element is energized or a holding wire fuses when energized in response to a failed self-test the plunger is released:

allowing the compressed or stretched spring to convert its potential energy into kinetic energy, and moving the plunger to generate a force to unlatch a latch releasing a first spring to open a contactor switch removing power from an electrical circuit, wherein the constant force generated by the compressed or stretched spring on the plunger inhibits the circuit interrupting device from resetting which permanently prevents reconnecting power to the electrical circuit.

17. The method of claim 16, wherein the temperature-activated, permanent lock out trip mechanism consists of:

at least one solder holding tube, the holding wire and the at least one heating element; and a base, wherein the compressed or stretched spring is compressed by the plunger against the base which is integrated into an enclosure of the circuit interrupting device, wherein the plunger is held in place by the holding wire that is affixed to the base by fusible metal in at least one solder holding tube, and wherein the base provides a fixed-point reference for the spring force of the compressed or stretched spring in the temperature-activated permanent lock out trip mechanism.

18. The method of claim 16, wherein the temperature-activated, permanent lock out trip mechanism to generate a force to unlatch the latch releasing the first spring to open the contactor switch removing power from the electrical circuit in response to a malfunction detected in a trip circuit, or a power supply, or sensors, or any of electronic detection circuits such that the temperature-activated, permanent lock out trip mechanism permanently prevents the circuit interrupting device from being turned back on and re-applying power to the electrical circuit.

19. A circuit interrupting device comprising:

a conductor; and a temperature-activated, permanent lock out trip mechanism including:

a plunger;

a compressed or stretched spring; and a fusible metal to hold the plunger in place that has a constant force exerted on it by either the compressed or stretched spring, wherein the temperature-activated, permanent lock out trip mechanism is configured such that when the fusible metal melts the plunger is released:

allowing the compressed or stretched spring to convert its potential energy into kinetic energy, and moving the plunger to generate a force to unlatch a latch releasing a first spring to open a contactor switch removing power from an electrical circuit, wherein the constant force generated by the compressed or stretched spring on the plunger inhibits the circuit interrupting device from resetting which permanently prevents reconnecting power to the electrical circuit.

20. The circuit interrupting device of claim 1, wherein the temperature-activated, permanent lock out trip mechanism consists of:

at least one solder holding tube;

a holding wire;

a heating element; and a base, wherein the compressed or stretched spring is compressed by the plunger against the base which is integrated into an enclosure of the circuit interrupting device, wherein the plunger is held in place by the holding wire that is affixed to the base by the fusible metal in at least one solder holding tube, and wherein the base provides a fixed-point reference for the spring force of the compressed or stretched spring in the temperature-activated permanent lock out trip mechanism.

* * * * *